US008611778B2

(12) United States Patent
Inukai

(10) Patent No.: US 8,611,778 B2
(45) Date of Patent: Dec. 17, 2013

(54) POWER SUPPLY SYSTEM AND IMAGE FORMING APPARATUS

(75) Inventor: Katsumi Inukai, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 185 days.

(21) Appl. No.: 13/289,878

(22) Filed: Nov. 4, 2011

(65) Prior Publication Data
US 2012/0114363 A1    May 10, 2012

(30) Foreign Application Priority Data

Nov. 5, 2010    (JP) ................. 2010-249101

(51) Int. Cl.
*G03G 15/00*    (2006.01)

(52) U.S. Cl.
USPC ........................................................ 399/88

(58) Field of Classification Search
USPC ............ 363/21.04, 21.07–21.08, 21.09, 21.1,
363/21.11, 21.12, 21.15, 21.18, 89, 127;
399/88, 89
See application file for complete search history.

(56) References Cited

U.S. PATENT DOCUMENTS

| 5,686,767 A | 11/1997 | Helfrich et al. |
| 5,834,857 A | 11/1998 | Abe et al. |
| 5,914,538 A | 6/1999 | Kurosawa et al. |
| 2009/0290385 A1* | 11/2009 | Jungreis et al. ................. 363/17 |
| 2010/0149840 A1 | 6/2010 | Hayasaki et al. |
| 2011/0083028 A1* | 4/2011 | Jung ............................. 713/323 |

FOREIGN PATENT DOCUMENTS

| JP | H06-351238 A | 12/1994 |
| JP | H07-087734 A | 3/1995 |
| JP | H07-298612 A | 11/1995 |
| JP | 2005-278272 A | 10/2005 |
| JP | 2008-125184 A | 5/2008 |
| JP | 2009-072060 A | 4/2009 |
| JP | 2009-278822 A | 11/2009 |
| JP | 2010-142071 A | 6/2010 |

* cited by examiner

*Primary Examiner* — David Gray
*Assistant Examiner* — Carla Therrien
(74) *Attorney, Agent, or Firm* — Baker Botts L.L.P.

(57) ABSTRACT

A power supply system includes: a switching power supply and a rectifying/smoothing circuit, the switching power supply configured to output a first output voltage in a normal output mode; a step-down circuit; a control device that controls the switching of the switching power supply between the normal output mode, a low output mode, and an off mode; and an electric storage unit charged by the output of the step-down circuit in the normal output mode and supplies power to the control device in the off mode, wherein, when charging is needed in the mode other than the normal output mode and the low output mode, the control device controls the switching power supply to output the third output voltage, thereby charging the electric storage unit.

10 Claims, 11 Drawing Sheets

FIG. 4

| CONTROL SIGNAL Sr2 | TRANSISTOR 33 | VOLTAGE DIVISION RATIO K OF DETECTION RESISTORS | OUTPUT VOLTAGE Vo1 FROM SWITCHING POWER SUPPLY |
|---|---|---|---|
| H LEVEL | ON | $\dfrac{R23}{R1 + R23}$ | 24V |
| L LEVEL | OFF | $\dfrac{R2}{R1 + R2}$ | 5.05V |

(WHERE R23 IS COMBINED RESISTANCE OF R2 AND R3)

FIG. 5

| OUTPUT MODE | DETAILS OF MODE | OUTPUT VOLTAGE (Vo1) FROM SWITCHING POWER SUPPLY | OUTPUT VOLTAGE (Vo2) FROM DC-DC CONVERTER | OUTPUT VOLTAGE (Vo3) FROM DC-DC CONVERTER |
|---|---|---|---|---|
| | NORMAL OUTPUT MODE | 24V | 5.15V | 3.3V |
| | LOW OUTPUT MODE | 5.05V | 5.0V | 3.3V |
| OFF MODE | | 0V | 0V | 0V |

POWER SUPPLY SYSTEM AND IMAGE FORMING APPARATUS

CROSS REFERENCE TO RELATED APPLICATION

The present application claims priority from Japanese Patent Application No. 2010-249101, which was filed on Nov. 5, 2010, the disclosure of which is herein incorporated by reference in its entirety.

TECHNICAL FIELD

The present invention relates to a power supply system and an image forming apparatus including the same.

BACKGROUND

Patent Document 1 discloses a technique in which, in the standby mode, a main power supply control unit stops the oscillation of an output transformer of a switching power supply and a secondary battery supplies power to the main power supply control unit, thereby reducing power consumption.

RELATED ART DOCUMENT

Patent Document

SUMMARY

In recent years, there has been demand for further reducing the power consumption of the switching power supply. In Patent Document 1, when the secondary battery is charged in the standby mode, the output transformer outputs 24 V, which results in unnecessary power consumption.

The invention has been made in view of the above-mentioned problems and an object of the invention is to suppress the power consumption of the switching power supply.

According to a first aspect of the invention, there is provided a power supply system including: a switching power supply that includes a transformer in which a voltage is induced on a secondary side by oscillation of a primary side and a rectifying/smoothing circuit which rectifies and smoothes the induced voltage, and outputs a first output voltage in a normal output mode; a step-down circuit that is provided on an output side of the switching power supply and reduces the first output voltage to a second output voltage; a control device that controls the switching of the switching power supply between the normal output mode, a low output mode in which an output voltage is a third output voltage less than the first output voltage, and an off mode that stops the oscillation of the primary side of the transformer; and an electric storage unit that is charged by the output of the step-down circuit in the normal output mode and supplies power to the control device in the off mode. When charging is needed in the mode other than the normal output mode and the low output mode, the control device controls the switching power supply to output the third output voltage, thereby charging the electric storage unit.

In the power supply system, when charging is needed in the mode other than the normal output mode and the low output mode, the switching power supply outputs the third output voltage to charge the electric storage unit. Therefore, it is possible to reduce the power consumption of the switching power supply, as compared to the case in which charging is performed by the first output voltage higher than the third output voltage.

According to a second aspect of the invention, in the power supply system according to the first aspect, when charging is needed in the off mode, the control device may control the switching power supply to output the third output voltage, thereby charging the electric storage unit. According to this structure, in the off mode, it is possible to maintain the electric storage unit in a charged state and stably supply power to the control device.

According to a third aspect of the invention, in the power supply system according to the first or second aspect, when the mode is changed from the normal output mode to the off mode and charging is needed, the control device may control the switching power supply to output the third output voltage, thereby charging the electric storage unit. According to this structure, since the mode is changed to the off mode with the electric storage unit being in the charged state, it is possible to maintain the charged state of the electric storage unit for a long time during the off mode.

According to a fourth aspect of the invention, the power supply system according to the second or third aspect may further include: a switching unit that switches a charging path of the electric storage unit, the charging path including a first path that supplies a charging current from the step-down circuit to the electric storage unit and a second path that directly supplies the charging current from the switching power supply to the electric storage unit without passing through the step-down circuit; and a switching control unit that outputs a switching signal to the switching unit to set the charging path to the second path when charging is needed in the off mode and/or when the mode is changed from the normal output mode to the off mode and charging is needed.

In the power supply system, when charging is needed in the off mode and/or when the mode is changed from the normal output mode to the off mode and charging is needed, the charging path of the electric storage unit is switched to the second path that does not pass through the step-down circuit. Therefore, while the electric storage unit is charged, it is possible to prevent the unnecessary power consumption of the step-down circuit.

According to a fifth aspect of the invention, in the power supply system according to the fourth aspect, when the mode is changed from the normal output mode to the off mode and the electric storage unit is charged, the switching control unit may output the switching signal to the switching unit to switch the charging path from the first path to the second path, at the time when an output voltage from the switching power supply is reduced from the first output voltage to the third output voltage.

In general, the withstanding voltage of the electric storage unit is about several tens of volts. Therefore, when a voltage higher than the withstanding voltage is applied, there is a concern that deterioration will be accelerated and the lifespan of a product will be reduced. In the power supply system, the charging path is switched at the time when the output voltage from the switching power supply is reduced from the first output voltage to the third output voltage. Therefore, there is no concern that a high voltage more than the withstanding voltage will be applied to the electric storage unit.

According to a sixth aspect of the invention, the power supply system according to the fifth aspect may further include an output voltage detecting unit that detects the output voltage from the switching power supply. The switching control unit may output the switching signal to the switching unit to switch the charging path from the first path to the second path on condition that the output voltage of the switching power supply detected by the output voltage detecting unit is reduced to the third output voltage.

As described above, in order to protect the electric storage unit, it is preferable to switch the charging path at the time when the output voltage from the switching power supply is reduced from the first output voltage to the third output voltage. As a method of switching the charging path at that timing, for example, the following method may be used: the time required for the output voltage from the switching power supply to be reduced from the first output voltage to the third output voltage is estimated by, for example, calculation and the charging path is switched after the estimated time has elapsed. However, it is not guaranteed that the output voltage from the switching power supply will be reduced to a calculated value. Therefore, in the above-mentioned method, it is necessary to ensure a predetermined margin and the switching timing of the charging path is later than the time when the output voltage from the switching power supply is reduced to the third output voltage. In order to solve the problem, in the power supply system, since the output voltage from the switching power supply is detected, it is possible to perform the operation of switching the charging path immediately after the output voltage from the switching power supply is reduced to the third output voltage. Therefore, it is possible to rapidly charge the electric storage unit, as compared to the method of measuring time and switching the charging path.

According to a seventh aspect of the invention, the power supply system according to any one of the fourth to sixth aspects may further include a stop circuit that turns off the step-down circuit. When the charging path is switched from the first path to the second path, the switching control unit may output a stop signal to the stop circuit to turn off the step-down circuit. In the power supply system, while the electric storage unit is charged through the second path, the step-down circuit is turned off. Therefore, the step-down circuit does not consume power and it is possible to reduce power consumption.

According to an eighth aspect of the invention, the power supply system according to any one of the first to seventh aspects may further include a charging voltage detecting unit that detects a voltage of the electric storage unit. In the power supply system, it is possible to appropriately determine whether the electric storage unit needs to be charged on the basis of the voltage level of the electric storage unit.

According to a ninth aspect of the invention, in the power supply system according to anyone of the first to eighth aspects, the third output voltage may be equal to or less than the second output voltage. In the power supply system, since the input voltage of the step-down circuit is equal to or less than the output voltage, a power loss in the step-down circuit is small.

According to a tenth aspect of the invention, an image forming apparatus includes: the power supply system according to any one of the first to ninth aspects; a high-voltage component that is supplied with power of the first output voltage from the switching power supply of the power supply system and performs a printing process; a first low-voltage component that is supplied with power of the second output voltage from the step-down circuit of the power supply system and controls the high-voltage component; and a second low-voltage component that is supplied with power of the second output voltage from the step-down circuit of the power supply system and performs a communication process of receiving print data. When the second low-voltage component receives the print data, the first low-voltage component controls the high-voltage component to perform the printing process of printing the print data. In the normal output mode, the switching power supply supplies the first output voltage to the high-voltage component and the step-down circuit supplies the second output voltage to the first low-voltage component and the second low-voltage component. In the low output mode, the switching power supply stops the supply of power to the high-voltage component and the step-down circuit supplies the second output voltage to the first low-voltage component and the second low-voltage component. In the off mode, the supply of power to all of the high-voltage component and the first and second low-voltage components is stopped. According to this structure, it is possible to suppress the power consumption of a power supply for the image forming apparatus.

According to the invention, it is possible to suppress the power consumption of a switching power supply.

BRIEF DESCRIPTION OF THE DRAWINGS

Illustrative aspects of the invention will be described in detail with reference to the following figures wherein:

FIG. 4 is a diagram illustrating the relation between a voltage division ratio and a target output voltage;

FIG. 5 is a diagram illustrating an output voltage from such as the switching power supply in each mode;

DETAILED DESCRIPTION OF EXEMPLARY EMBODIMENTS OF THE PRESENT INVENTION

<First Embodiment>

A first embodiment of the invention will be described with reference to FIGS. 1 to 7.

1. Description of Printer

Figure 1:
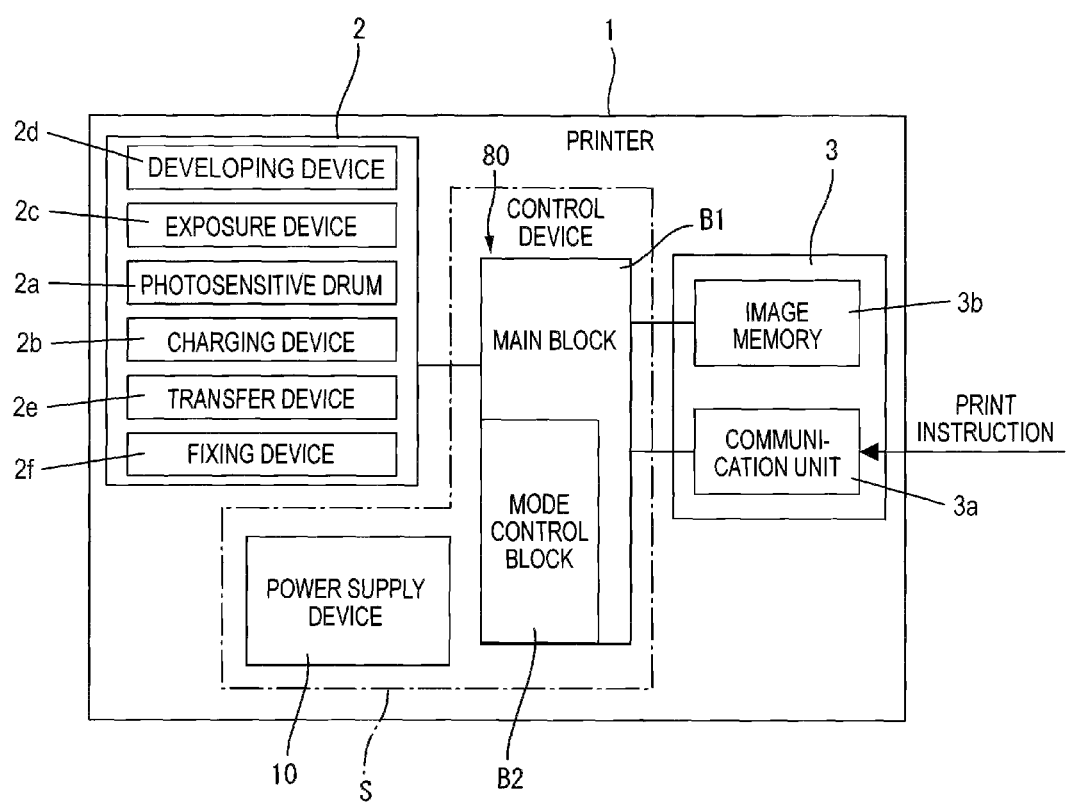
FIG. 1 is a block diagram illustrating the structure of a printer according to a first embodiment of the invention.

FIG. 1 is a block diagram illustrating the electrical structure of a printer (an example of an "image forming apparatus" according to the invention) 1. The printer 1 includes a printing unit 2, a communication unit 3$a$, an image memory 3$b$, and a power supply system S. The power supply system S includes a power supply device 10 and a control device 80. The power supply device 10 is a power supply for the printer 1 and supplies power to the printing unit 2, the communication unit 3$a$, the image memory 3$b$, and the control device 80.

The printing unit 2 includes, for example, a photosensitive drum 2$a$, a charging device 2$b$ that performs a charging process of charging the surface of the photosensitive drum 2$a$, an exposure device 2$c$ that performs an exposure process of forming an electrostatic latent image on the surface of the photosensitive drum 2a, a developing device 2d that performs a developing process of attaching a developer to the electrostatic latent image formed on the surface of the photosensitive drum 2a to form a developer image, a transfer device 2e that performs a transfer process of transferring the developer image onto a recording medium, and a fixing device 2f that performs a fixing process of fixing the developer image transferred onto the recording medium.

The printing unit 2 performs a printing process of performing the charging process, the exposure process, the developing process, the transfer process, and the fixing process to print print data on the recording medium. The communication unit 3a communicates with an information terminal apparatus, such as a PC, and has a function of receiving a print instruction or print data from the information terminal apparatus. The image memory 3b temporarily stores the print data received from the information terminal apparatus.

In the printer 1, when the communication unit 3a receives print data in response to a print instruction from the information terminal apparatus, a main block B1 of the control device 80 directs the printing unit 2 to perform the printing process including the charging process, the exposure process, the developing process, the transfer process, and fixing process to print the print data on the recording medium. The operation voltage of the printing unit 2 is 24 V and the operation voltage of the communication unit 3a, the image memory 3b, and the control device 80 is 3.3 V. In addition, the printing unit 2 is an example of a "high-voltage component" according to the invention. The main block B1 of the control device 80 is an example of a "first low-voltage component" according to the invention. The communication unit 3a is an example of a "second low-voltage component" according to the invention.

2. Description of Circuit Structure

First, the structure of the power supply device 10 in the power supply system S will be described with reference to FIG. 2. The power supply device 10 includes a switching power supply 20, a DC-DC converter (an example of a "step-down circuit according to the invention) 35, and a DC-DC converter 45. The switching power supply 20 includes a rectifying/smoothing circuit 21, a transformer 23, an FET (field effect transistor) 25, a rectifying/smoothing circuit 27, a voltage detecting circuit 29, a control IC 50 that performs switching control on the FET 25.

The rectifying/smoothing circuit 21 is a so-called capacitor input type and includes a bridge diode D1 that rectifies an AC voltage (for example, 220 V) of an AC power supply 15 and a capacitor C1 that smoothes the rectified voltage. The transformer 23 is provided on the output side of the rectifying/smoothing circuit 21 and an input voltage Vin (a DC voltage of about 322 V) obtained by rectifying and smoothing the AC voltage is applied to a primary coil N1 of the transformer 23 through an input line Lin.

The FET 25 is an N-channel MOSFET and has a drain D connected to the primary coil N1 and a source S connected to the ground. In addition, the FET 25 has a gate G connected to an output port OUT of the control IC 50. In this structure, when the control IC 50 outputs an on/off signal (PWM signal) to the gate G through the output port OUT, the FET 25 is turned on or off. In this way, the primary side of the transformer 23 is oscillated and a voltage is induced in a secondary coil N2 of the transformer 23.

A voltage generating circuit 26 is provided on the primary side of the transformer 23. The voltage generating circuit 26 rectifies and smoothes the voltage induced in an auxiliary coil N3 which is provided on the primary side of the transformer 23 using a diode D2 and a capacitor C2. The voltage generating circuit 26 generates a voltage of about 20 V and serves as a power supply for the control IC 50.

The rectifying/smoothing circuit 27 is provided on the secondary side of the transformer 23 and includes a diode D3 and a capacitor C3. The rectifying/smoothing circuit 27 rectifies and smoothes the voltage induced in the secondary coil N2 of the transformer 23. In this way, the switching power supply 20 outputs an output voltage Vo1 through an output line Lo1. In addition, the voltage detecting circuit 29 is provided on the output side of the rectifying/smoothing circuit 27.

The voltage detecting circuit 29 has a function of detecting the output voltage Vo1 from the switching power supply 20 and a function of changing the target value of the output voltage Vo1 and includes a pair of detection resistors R1 and R2, a voltage division ratio change circuit 32, a shunt regulator RE1, and a light emitting diode LED1 which is connected in series to the shunt regulator RE1.

The detection resistors R1 and R2 are connected in series to each other between the output line Lo1 and the ground. The voltage division ratio change circuit 32 includes a resistor R3 and a transistor 33. The resistor R3 has one end connected to a connection point between the resistors R1 and R2 and the other end connected to a collector C of the transistor 33.

The transistor 33 is an NPN transistor and has an emitter E connected to the ground. A base B of the transistor 33 is connected to an output port P6 of the control device 80 through a resistor R8 (see FIG. 3).

The voltage division ratio change circuit 32 has a function of changing the voltage division ratio K of the detection resistors, depending on whether the transistor 33 is turned on or off. That is, when the transistor 33 is turned on, the voltage division ratio K is R23/(R1+R23). On the other hand, when the transistor 33 is turned off, the voltage division ratio K is R2/(R1+R2) (see FIG. 4). R23 is the combined resistance of the resistor R2 and the resistor R3.

The shunt regulator RE1 supplies a current corresponding to the level difference between a reference voltage Vr (for example, 2.5 V) set to the inside of the shunt regulator RE1 and a divided voltage Vg (voltage at a point g) obtained by dividing the output voltage Vo1 from the switching power supply 20 by the voltage division ratio K.

In this way, a current flows to the light emitting diode LED1 and the light emitting diode LED1 outputs an optical signal with the amount of light corresponding to the level difference between the reference voltage and the divided voltage Vg. The light emitting diode LED1 and a phototransistor PT1 connected to the feedback port FB of the control IC 50 form a photocoupler.

Therefore, the optical signal of the light emitting diode LED1 is restored to an electric signal by the phototransistor PT1. In this way, a signal (hereinafter, referred to as a feedback signal) indicating the level difference between the reference voltage Vr of the shunt regulator RE1 and the divided voltage Vg is fed back to the feedback port FB of the control IC 50.

Figure 2:
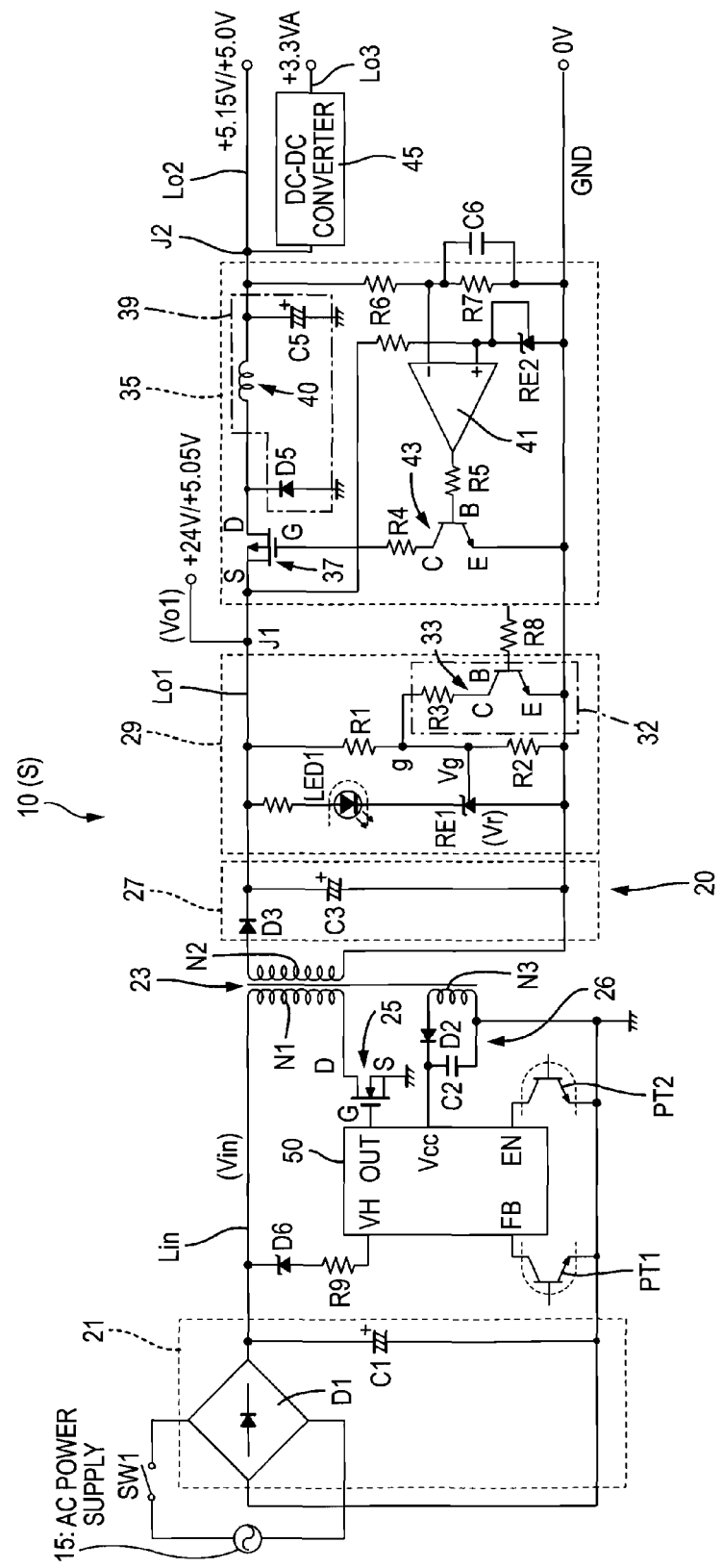
FIG. 2 is a circuit diagram illustrating a power supply device of a power supply system.

As shown in FIG. 2, the output line Lo1 of the switching power supply 20 is branched into two lines at a branch point J1. The DC-DC converter 35 is provided on the branched line.

The DC-DC converter 35 reduces an output voltage Vo1 of 24 V output from the switching power supply 20 to an output voltage Vo2 of 5.15 V and includes an FET 37, a smoothing circuit 39, a comparator 41, a transistor 43, detection resistors R6 and R7, and a capacitor C6.

The FET 37 is a P-channel MOSFET and has a source S connected to the input side (the output side of the switching power supply 20) and a drain D connected to the output side (the side of the smoothing circuit 39). The smoothing circuit 39 includes a choke coil 40, a capacitor C5, and a diode D5. The capacitor C5 is provided between an output line Lo2 and the ground and the diode D5 is connected between the output line Lo2 and the ground such that a direction from the ground to the output line Lo2 is the forward direction. The smoothing circuit 39 smoothes the waveform of the voltage passing through the FET 37.

The transistor 43 has a collector C connected to the gate G of the FET 37 through the resistor R4. The transistor 43 is an NPN transistor and has an emitter E connected to the ground. In addition, the transistor 43 has a base B connected to the output terminal of the comparator 41 through the resistor R5.

The comparator 41 includes two input terminals, that is, a positive input terminal to which the reference voltage is applied through a shunt regulator RE2 and a negative input terminal which is connected to an intermediate connection point between the detection resistors R6 and R7. The detection resistors R6 and R7 are provided between the output line Lo2 and the ground, divide the output voltage Vo1 from the DC-DC converter 35 by the resistance ratio, and detect the divided voltages. The capacitor C6 is connected in parallel to the detection resistor R7 and produces hysteresis characteristics in the comparator 41.

Next, the circuit operation of the DC-DC converter 35 will be described. When a voltage value obtained by dividing the output voltage Vo2 by the resistance ratio is less than the reference voltage, the output of the comparator 41 is at a high level and both the transistor 43 and the FET 37 are turned on. Then, the on time of the FET 37 increases and the output voltage Vo2 increases to a target value.

On the other hand, when the voltage value obtained by dividing the output voltage Vo2 by the resistance ratio is higher than the reference voltage, the output of the comparator 41 is at a low level and both the transistor 43 and the FET 37 are turned off. Then, the on time of the FET 37 is reduced and the output voltage Vo2 is reduced to the target value.

As shown in FIG. 2, the output line Lo2 of the DC-DC converter 35 is further branched at a branch point J2. The DC-DC converter 45 is provided on the branched line. The DC-DC converter 45 has the same circuit structure as the DC-DC converter 35, reduces an output voltage Vo2 of 5.15 V output from the DC-DC converter 35, and outputs an output voltage V03 of 3.3 V.

The control IC 50 includes five ports, that is, a power supply port Vcc that is connected to the voltage generating circuit 26, a high-voltage input port VH that is connected to the input line Lin through a resistor R9 and a zener diode D6, a feedback port FB to which the feedback signal is input from the voltage detecting circuit 29, an output port OUT, and a control input port EN to which a control pulse signal Sr1 output from the control device 80 is input.

The control IC 50 includes a PWM comparator (not shown) and an oscillation circuit (not shown) that oscillates a triangular wave. When the feedback signal is input to the feedback port FB, the control IC 50 generates a PWM signal corresponding to the feedback signal and outputs the PWM signal to the gate G of the FET 25 through the output port OUT. In this way, the output voltage Vo1 from the switching power supply 20 is controlled so as to be equal to the target voltage.

The control IC 50 has a function of stopping or restarting the switching control (on off control) of the FET 25 on the basis of the control pulse signal Sr1 output from the control device 80 which will be described below.

Figure 3:
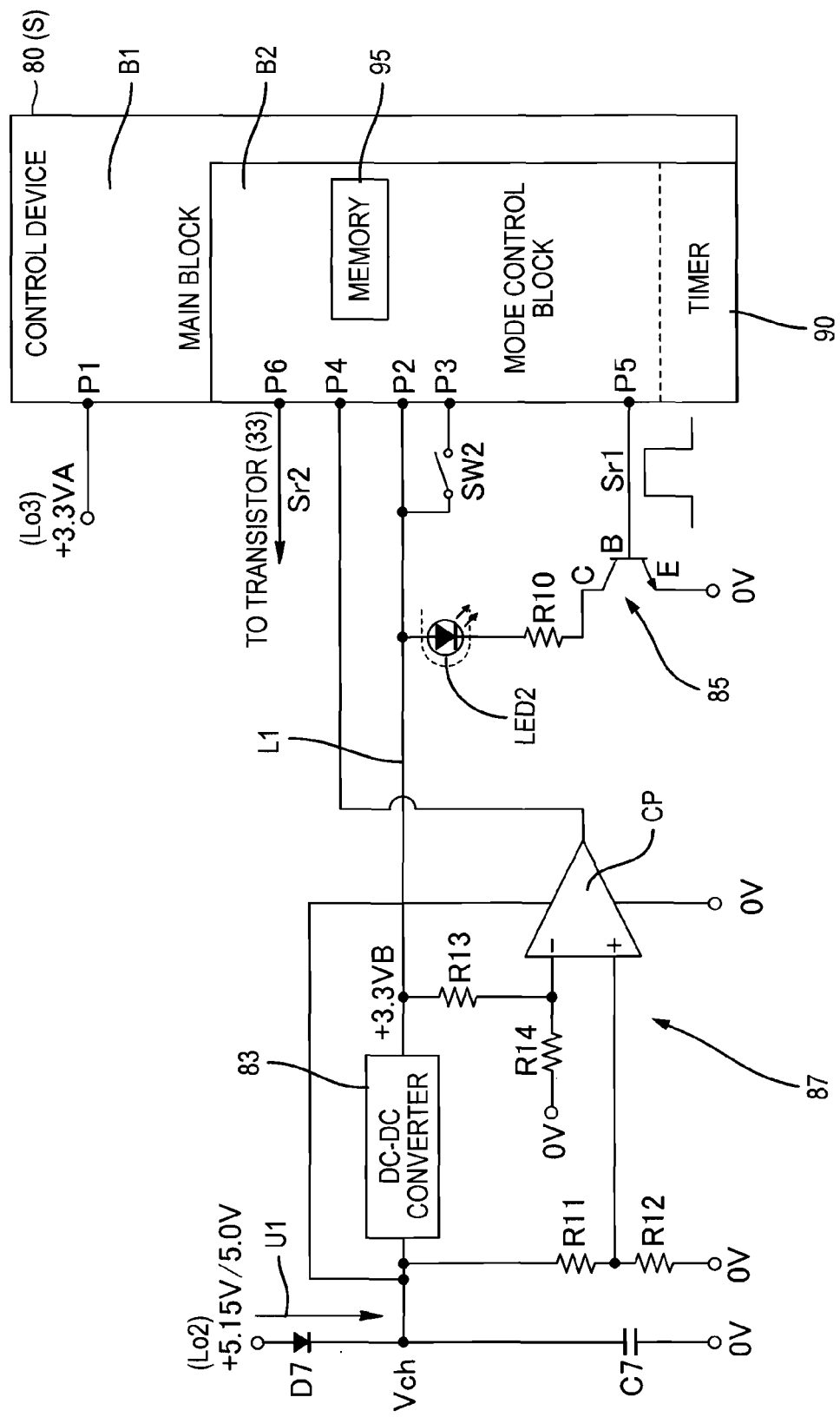
FIG. 3 is a circuit diagram illustrating a control device of the power supply system.
Figure 6A:
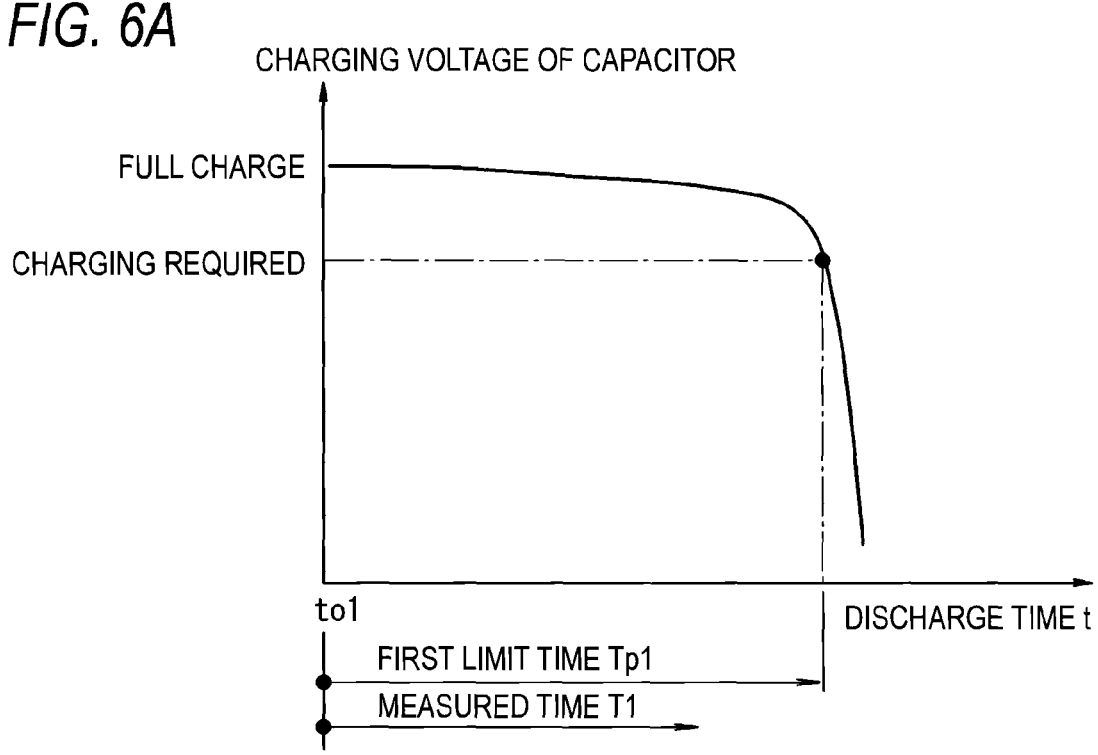
FIG. 6A is a diagram illustrating the charging characteristics of a capacitor.
Figure 6B:
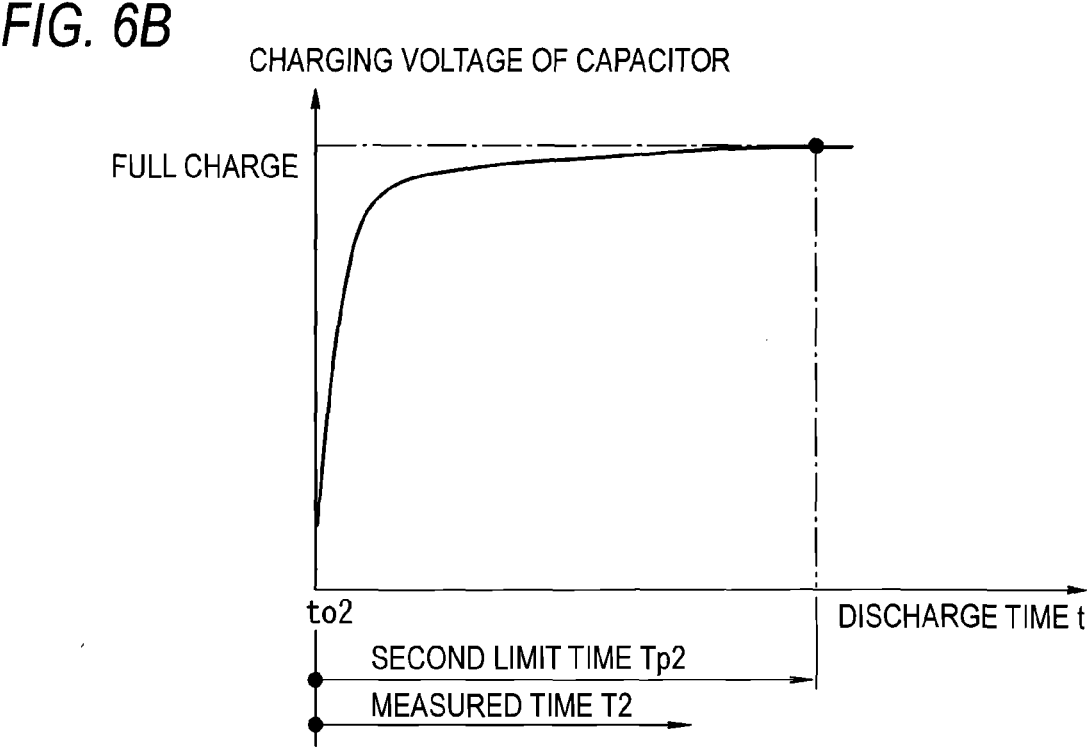
FIG. 6B is a diagram illustrating the charging characteristics of the capacitor.

Next, the structure of the control device 80 in the power supply system S will be described with reference to FIG. 3. The control device 80 includes a main block B1 that controls the printing unit 2 of the printer 1 and a mode control block B2 that controls the mode of the switching power supply 20. The mode control block B2 includes a timer unit 90 and an internal memory 95.

A power supply port P1 of the main block B1 is connected to an output line Lo3 of the DC-DC converter 45 and an output voltage V03 of 3.3 V from the DC-DC converter 45 is applied to the power supply port P1.

A power supply port P2 of the mode control block B2 is connected to the DC-DC converter 35. Specifically, a capacitor (electric double layer capacitor for storage) C7 is connected to the output line Lo2 of the DC-DC converter 35 through a diode D7. A relay line L1 is drawn from a connection point between the capacitor C7 and the diode D7. The capacitor C7 is an example of an "electric storage unit" according to the invention.

A DC-DC converter 83 is provided on the relay line L1, reduces the output voltage Vo1 from the DC-DC converter 35 to 3.3 V, and applies the voltage to the power supply port P2 of the mode control block B2.

In addition, the mode control block B2 includes two input ports P3 and P4 and two output ports P5 and P6. A switch SW2 is connected to the input port P3. The switch SW2 is a manual switch for changing the mode of the switching power supply 20 to the output mode and the off mode.

A detection signal (a binary signal output from the comparator CP) output from a charging voltage detecting circuit 87 is input to the input port P4. The charging voltage detecting circuit (an example of a "charging voltage detecting unit" according to the invention) 87 includes detection resistors R11 and R12 that detect a charging voltage Vch of the capacitor C7, a comparator CP that compares the voltage value detected by the detection resistors R11 and R12 with a reference value and outputs the comparison result, and voltage dividing resistors R13 and R14 for generating a reference voltage.

When the charging voltage Vch is higher than the reference voltage, the comparator CP outputs a high-level detection signal to the port P4 of the mode control block B2. When the charging voltage Vch is lower than the reference voltage, the comparator CP outputs a low-level detection signal to the port P4.

The output port P5 is for outputting the control pulse signal Sr1 to the control input port EN of the control IC 50. Specifically, a light emitting diode LED2 is connected to the relay line L1. The light emitting diode LED2 has an anode connected to the relay line L1 and a cathode connected to a collector C of an NPN transistor 85 through a resistor R10.

An emitter E of the transistor 85 is connected to the ground and a base B of the transistor 85 is connected to the output port P5 of the mode control block B2. The light emitting diode LED2 and a phototransistor PT2 connected to the control input port EN of the control IC 50 form a photocoupler.

According to this structure, the control pulse signal Sr1 output from the output port P5 is optically transmitted by the light emitting diode LED2 and the phototransistor PT2 and is input to the control input port EN of the control IC 50. The output port P6 is connected to the base B of the transistor 33 in the voltage division ratio change circuit 32 through a resistor R8.

3. Description of Mode Control by Mode Control Block B2

(3-1) Change in Mode Between Output Mode and Off Mode

As shown in FIG. 5, the switching power supply 20 of the power supply system S has the output mode and the off mode. The output mode oscillates the primary side of the transformer 23 such that the switching power supply 20 is in an output state. The off mode stops the oscillation of the transformer 23 to stop the output of the switching power supply 20.

The mode control block B2 of the control device 80 can output the control pulse signal Sr1 to the control IC 50 to change the switching power supply 20 from the output mode to the off mode or from the off mode to the output mode.

In the output mode, when the control pulse signal Sr1 is received, the control IC 50 controls the power supply port Vcc to be in a high impedance state, thereby stopping the switching control of the FET 25. In this way, the oscillation of the primary side of the transformer 23 is stopped. Therefore, the switching power supply 20 becomes an output stop state and is changed to the off mode.

In the off mode, when the control pulse signal Sr1 is received, the control IC 50 cancels the high impedance state of the power supply port Vcc, restarts the switching control of the FET 25, and outputs an on/off signal from the output port OUT to the FET 25. In this way, the FET 25 is turned on or off and the primary side of the transformer 23 is oscillated. Therefore, the switching power supply 20 becomes an output state and is changed from the off mode to the output mode.

(3-2) Change in Mode Between Normal Output Mode and Low Output Mode

As represented by the following Expression 1, the target value of the output voltage Vo1 from the switching power supply 20 is proportional to the reciprocal of the voltage division ratio K of the detection resistors in the voltage detecting circuit 29. Therefore, as the voltage division ratio K decreases, the target value of the output voltage Vo1 increases. As the voltage division ratio K increases, the target value of the output voltage Vo1 decreases.

$$Vo1=Vr/K; \qquad \text{Expression 1}$$

$$K1=R23/(R1+R23); \text{ and} \qquad \text{Expression 2}$$

$$K2=R2/(R1+R2) \qquad \text{Expression 3}$$

(where Vo1 indicates the output voltage from the switching power supply, Vr indicates the reference voltage of the shunt regulator RE1, K indicates the voltage division ratio of the detection resistors in the voltage detecting circuit 29, and R23 indicates the combined resistance of R2 and R3).

Therefore, it is possible to change the output voltage Vo1 from the switching power supply 20 by outputting a first control signal Sr2 at a high or low level from the mode control block B2 to the voltage division ratio change circuit 32 to change the value of the voltage division ratio K. In this way, it is possible to change the mode of the switching power supply 20 between the normal output mode and the low output mode.

Specifically, when the mode control block B2 outputs the first control signal Sr2 at a high level, the transistor 33 is turned on and the voltage division ratio K is "K1", as represented by the above-mentioned Expression 2. On the other hand, when the first control signal Sr2 is output at a low level, the transistor 33 is turned off and the voltage division ratio K is "K2", as represented by the above-mentioned Expression 3.

The magnitude relation between the voltage division ratio K1 and the voltage division ratio K2 is "K1"<"K2". Therefore, when the mode control block B2 outputs the first control signal Sr2 at a high level, the target value of the output voltage Vo1 from the switching power supply 20 is a "high voltage (24 V)" (normal output mode). In the normal output mode, as shown in FIG. 5, the DC-DC converters 35 and 45 output 5.15 V and 3.3 V, respectively.

An output voltage of "24 V" from the switching power supply 20 corresponds to a "first output voltage" according to the invention and an output voltage of "5.15 V" from the DC-DC converter 35 corresponds to a "second output voltage" according to the invention.

When the mode control block B2 outputs the first control signal Sr2 at a low level, the target value of the output voltage Vo1 is a "low voltage (5.05 V)" (low output mode). In the low output mode, as shown in FIG. 5, the DC-DC converters 35 and 45 output 5.0 V and 3.3 V, respectively. An output voltage of "5.05 V" from the switching power supply 20 corresponds to a "third output voltage" according to the invention.

In the low output mode, there is a voltage difference of 0.05 V between the input and output of the DC-DC converter 35. This is because a voltage drop of about 0.05 V occurs due to the resistor components of the FET 37 and the coil 40.

Figure 7:
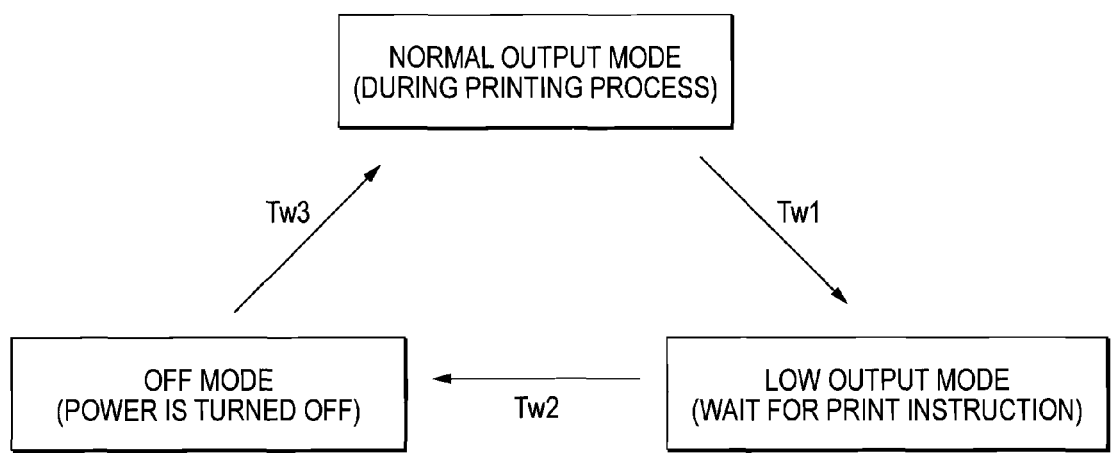
FIG. 7 is a diagram illustrating a mode change pattern.

The three modes, that is, the normal output, the low output mode, and the off mode correspond to a printing process, the waiting of a print instruction, and the turning-off of the power supply, respectively, as shown in FIG. 7. The mode is changed depending on the usage of the printer 1 (which will be described in detail in the following operation).

4. Description of Operation of Power Supply System S (4-1) Change to Normal Output Mode after AC Power Supply 15 Turned on When a power switch SW1 (see FIG. 2) is turned on, an input voltage Vin obtained by rectifying and smoothing an AC voltage is applied to the input line Lin. Then, the input voltage Vin is input the high-voltage input port VH of the control IC 50 and the control IC 50 starts.

After the control IC 50 starts, the output of the on/off signal (PWM signal) to the gate G of the FET 25 starts. Then, the FET 25 is repeatedly turned on and off. Therefore, the primary side of the transformer 23 of the switching power supply 20 starts to be oscillated and a voltage is induced on the secondary side of the transformer 23 (the start of oscillation).

The control IC 50 performs so-called soft start control after the on/off signal is output. Therefore, the output voltage Vo1 from the switching power supply 20 increases slowly. When the output voltage Vo1 from the switching power supply 20 is more than a predetermined level, the control IC 50 is changed to feedback control. Thereafter, the control IC 50 performs PWM output based on the feedback signal input to the feedback port FB.

When power is turned on, the mode control block B2 outputs the first control signal Sr2 at a high level and the transistor 33 is turned on. Therefore, the voltage division ratio K is "K1" and the target voltage of the output voltage Vo1 is "24 V".

In this way, the switching power supply 20 outputs "24 V". The DC-DC converter 35 reduces the output voltage of "24 V" from the switching power supply 20 to "5.15 V" and the DC-DC converter 45 further reduces the output voltage of "5.15 V" to "3.3 V and outputs the voltage (normal output mode).

In the normal output mode, the power supply device 10 supplies power to each component of the printer 1. That is, the switching power supply 20 supplies power to the printing unit 2 through the output line Lo1 (power supply voltage: 24 V). In addition, the switching power supply 20 supplies power to the communication unit 3a, the image memory 3b, and the main block B1 of the control device 80 through the DC-DC converters 35 and 45 (power supply voltage: 3.3 V). The switching power supply 20 supplies power to the mode control block B2 of the control device 80 through the DC-DC converters 35 and 83 (power supply voltage: 3.3 V). Therefore, the printer 1 is in a printable state, that is, a state in which it can receive a print instruction from an information terminal apparatus, such as a PC, and perform a printing process corresponding to the print instruction.

In the normal output mode, a charging current is supplied from the DC-DC converter 35 to the capacitor C7 through a first path (a path including the output line Lo2 and the diode D7) U1 to charge the capacitor C7.

(4-2) Change in Mode from Normal Output Mode to Low Output Mode

In the normal output mode, the mode control block B2 of the control device 80 measures the waiting time of the print instruction or the operation of the operation unit when a warming-up operation, a printing process, or the operation of the operation unit (not shown) provided in the printer 1 by the user is completed after the power switch SW1 is turned on. When the waiting time reaches a set time Tw1, the mode control block B2 changes the mode of the switching power supply 20 from the normal output mode to the low output mode.

Specifically, the mode control block B2 outputs the first control signal Sr2 at a low level from the output port P6. Then, the transistor 33 is turned off. In this way, the voltage division ratio K of the detection resistors in the voltage detecting circuit 29 is changed from "K1" to "K2". As a result, the target voltage of the output voltage Vo1 is "5.05 V".

In this way, the switching power supply 20 outputs "5.05 V". The DC-DC converter 35 outputs "5.0 V" and the DC-DC converter 45 outputs "3.3 V" (low output mode).

In the low output mode, similarly to the normal output mode, the switching power supply 20 supplies power to the main block B1 of the control device 80, or the communication unit 3a and the image memory 3b through the DC-DC converters 35 and 45 (power supply voltage: 3.3 V). In addition, the switching power supply 20 supplies power to the mode control block B2 of the control device 80 through the DC-DC converters 35 and 83 (power supply voltage: 3.3 V).

In the low output mode, since the output voltage Vo1 from the switching power supply 20 is "5.05 V" which is less than the operation voltage, 24 V, of the printing unit 2, the supply of power to the printing unit 2 is stopped. Therefore, in the low output mode, the printer 1 can perform a communication process or a process of writing the print data received by the communication process to the image memory 3b, but all operations of the printing unit 2 are stopped.

In the low output mode, the charging current is supplied from the DC-DC converter 35 to the capacitor C7 through the first path U1. Therefore, in the low output mode, the capacitor C7 is charged, similarly to the normal output mode.

(4-3) Change in Mode from Low Output Mode to Off Mode

The mode control block B2 of the control device 80 measures the waiting time of the print instruction or the operation of the operation unit when the mode is changed to the low output mode. When the waiting time reaches a set time Tw2 without the printer 1 receiving the print instruction, the mode control block B2 changes the mode of the power supply system S from the low output mode to the off mode. Specifically, the mode control block B2 outputs the control pulse signal Sr1 from the output port P5. Then, the control pulse signal Sr1 is optically transmitted through the photocoupler and is input to the control input port EN of the control IC 50.

Then, the control IC 50 controls the output port OUT to be in a high impedance state, the oscillation of the primary side of the transformer 23 is stopped. Therefore, the switching power supply 20 stops the output of the voltage and the power supply system S is changed to the off mode.

In the off mode, since the switching power supply 20 and the DC-DC converters 35 and 45 are all in the output stop state, the supply of power to the printing unit 2, the main block B1 of the control device 80, the communication unit 3a, and the image memory 3b is stopped. The mode control block B2 of the control device 80 is supplied with power from the capacitor C7 and is operated. In the off mode, the mode control block B2 checks the levels of the input ports P3 and P4 and checks whether the switch SW2 is operated and the charged state of the capacitor C7.

(4-4) Change in Mode from Off Mode to Normal Output Mode

The off mode is maintained for a predetermined set time Tw3. When the set time Tw3 has elapsed, the mode control block B2 of the control device 80 outputs the control pulse signal Sr1. Then, the control IC 50 cancels the high impedance state of the power supply port Vcc and resumes the output of the on/off signal. As a result, the FET 25 is turned on and off and the oscillation of the transformer 23 is resumed.

The mode control block B2 outputs the first control signal Sr2 at a high level in parallel to the output of the control pulse signal Sr1, thereby turning on the transistor 33. Then, the voltage division ratio K is set to "K1" and the target voltage of the output voltage Vo1 is "24 V". In this way, the switching power supply 20 is changed from the off mode to the normal output mode.

As such, when the state in which an information terminal apparatus, such as a PC, does not issue a print instruction or the state in which the operation unit is not operated by the user is maintained, the mode of the power supply system S is repeatedly changed in the order of the normal output mode, the low output mode, the off mode, and the normal output mode, as represented by a solid line in FIG. 7. When there is a print instruction in the normal output mode, the printing process is performed. In the low output mode, the power supply system S is changed to the normal output mode such that the printing process is performed. When the print instruction is not issued for the set time Tw1 after the printing process is completed, the mode check operation is repeatedly performed.

(4-5) Change in Mode by Operation of Switch Sw2

Next, when the switch SW2 is operated by the user in the state in which the mode is repeatedly changed, the mode control block B2 of the control device 80 outputs the control pulse signal Sr1 to the transistor 85. Then, the control pulse signal Sr1 is optically transmitted through the photocoupler and is input to the control input port EN of the control IC 50. Then, the control IC 50 changes the output state of the on/off signal (PWM signal) to the FET 25 from the output state to the stop state or from the stop state to the output state.

Therefore, when the switch SW2 is operated in the output mode (the normal output mode and the low output mode), the switching power supply 20 is changed to the off mode. When the switch SW2 is operated in the off mode, the switching power supply 20 is changed to the output mode (the normal output mode or the low output mode).

5. Charging Operation when Charging is Needed in Modes Other than Normal Output Mode and Low Output Mode (5-1) Charging Operation in Off Mode The mode control block B2 of the control device 80 directs the timer unit 90 to measure the time elapsed from the start time (the discharge start time of the capacitor C7) to1 of the off mode when the mode is changed to the off mode. A first limit time Tp1, which is the maximum operating time of the capacitor C7 (time required for charging the capacitor from a fully-charged state) is stored in the internal memory 95 of the mode control block B2 in advance (see FIG. 6A). The fully-charged state indicates a state in which a sufficient amount of charge is stored in the capacitor C7 (the charging amount is substantially 100%).

When the time T1 measured by the timer unit 90 reaches the first limit time Tp1, the mode control block B2 of the control device 80 determines that charging is needed for the following reason: when the capacitor C4 is discharged in this way, the voltage Vch is reduced and it is difficult for the DC-DC converter 83 to maintain the voltage at 3.3 V. When it is determined that charging is needed, the mode control unit B2 outputs the control pulse signal Sr1. Then, the control IC 50 cancels the high impedance state of the power supply port Vcc and resumes the output of the on/off signal. As a result, the FET 25 is turned on and off and the oscillation of the transformer 23 is resumed.

In addition, the mode control block B2 outputs the first control signal Sr2 at a low level in parallel to the output of the control pulse signal Sr1, thereby turning off the transistor 33. Then, the voltage division ratio K is set to "K2" and the target voltage of the output voltage Vo1 is "5.05 V"

In this way, the output voltage Vo1 from the switching power supply 20 is "5.05 V". The output voltage Vo2 from the DC-DC converter 35 is "5.0 V". Then, a charging current is supplied from the DC-DC converter 35 to the capacitor C7 through the first path U1. In this way, the capacitor C7 is charged.

As such, in the power supply system S, when charging is needed in the off mode, the output voltage Vo1 from the switching power supply 20 is "5.05 V" and the capacitor C7 is changed. Therefore, it is possible to reduce a loss and power consumption, as compared to the structure in which charging is performed with an output voltage Vo1 of "24 V" from the switching power supply 20.

When the charging voltage Vch of the capacitor C7 is reduced and a low-level detection signal is output from the comparator CP of the charging voltage detecting circuit 87 before the measured time T1 reaches the first limit time Tp1, the output voltage Vo1 from the switching power supply 20 is "5.05 V" and the capacitor C7 is charged, similarly to the above. In this way, it is possible to reliably charge the capacitor C7 before the DC-DC converter 83 cannot be maintained at 3.3 V in the off mode. Therefore, it is possible to stably supply power to the mode control block B2 of the control device 80.

When the capacitor C7 is fully charged by the above-mentioned charging operation, the mode control block B2 outputs the control pulse signal Sr1 from the output port P5. Then, the control pulse signal Sr1 is optically transmitted through the photocoupler and is input to the control input port EN of the control IC 50. Then, the control IC 50 controls the output port OUT to be in a high impedance state. As a result, the oscillation of the transformer 23 is stopped. Therefore, the switching power supply 20 stops the output of power and returns to the normal off mode.

(5-2) Charging Operation when Mode is Changed from Normal Output Mode to Off Mode As described above, the switch SW2 is operated to change the mode of the switching power supply 20 from the normal output mode to the off mode. When the mode is changed from the normal output mode to the off mode and the capacitor C7 does not reach the fully-charged state, the mode control block B2 of the control device 80 determines that charging is needed. When it is determined that charging is needed, the mode control block B2 outputs the first control signal Sr2 at a low level from the output port P6 to turn off the transistor 33.

The output voltage Vo1 from the switching power supply 20 is "5.05 V" and the output voltage Vo2 from the DC-DC converter 35 is "5.0 V". A charging current is supplied from the DC-DC converter 35 to the capacitor C7 through the first path U1 and the capacitor C7 is charged. After the charging, the mode control block B2 outputs the control pulse signal Sr1 from the output port P5 to change the switching power supply 20 to the off mode.

As such, when charging is needed during a change in the mode from the normal output mode to the off mode, output voltage Vo1 from the switching power supply 20 is changed to "5.05 V" and the capacitor C7 is charged. Therefore, it is possible to reduce power consumption, as compared to the structure in which charging is performed with an output voltage Vo1 of "24 V" without changing the output voltage.

Whether the capacitor C7 is fully charged is determined as follows. That is, the mode control block B2 directs the timer unit 90 to start the measurement of the time elapsed from the start time tot (the charging start time of the capacitor C7) of the normal output mode. A second limit time Tp2, which is the time required for charging the capacitor C7 (time from the start of charging to full charge), is stored in the internal memory 95 of the mode control block B2 in advance (see FIG. 6B).

When the time T2 measured by the timer unit 90 reaches the second limit time Tp2 and there is an instruction to change the mode from the normal output mode to the off mode (specifically, the switch SW2 is operated), the mode control block B2 determines that the capacitor is not fully charged.

When a mode change instruction is issued after the time T2 measured by the timer unit 90 reaches the second limit time Tp2, the mode control block B2 determines that the capacitor is fully charged. In this case, the mode control block B2 changes the mode of the switching power supply 20 from the normal output mode to the off mode in response to the mode change instruction.

6. Operation and Effect

As described above, in the off mode, the power supply system S stops the oscillation of the transformer 23. Therefore, it is possible to reduce power consumption.

When charging is needed in the modes other than the normal output mode and the low output mode, specifically, when the charging is needed in the off mode and when charging is needed during a change in the mode from the normal output mode to the off mode, the output voltage Vo1 from the switching power supply 20 is "5.05 V" and the capacitor C7 is charged. Therefore, it is possible to reduce power consumption, as compared to the structure in which the output voltage Vo1 from the switching power supply 20 is "24 V" and charging is performed.

In this embodiment, in the low output mode, the output voltage Vo1 from the switching power supply 20 is "5.05 V". In the normal output mode, the output voltage Vo1 from the DC-DC converter 35 is "5.15 V" which is more than the output voltage Vo1. Therefore, in the low output mode, the FET 37 of the DC-DC converter 35 is not turned off, but is constantly turned on. Therefore, a loss occurring when the FET 37 is turned on and off is substantially zero.

<Second Embodiment>

A second embodiment of the invention will be described with reference to FIGS. 8 to 10. In the first embodiment, the first path U1 passing through the output line Lot of the DC-DC converter 35 and the diode D7 is used as the charging path of the capacitor C7. The second embodiment is different from the first embodiment in that two paths, that is, a first path U1 and a second path U2 are used as the charging path of the capacitor C7.

Figure 8:
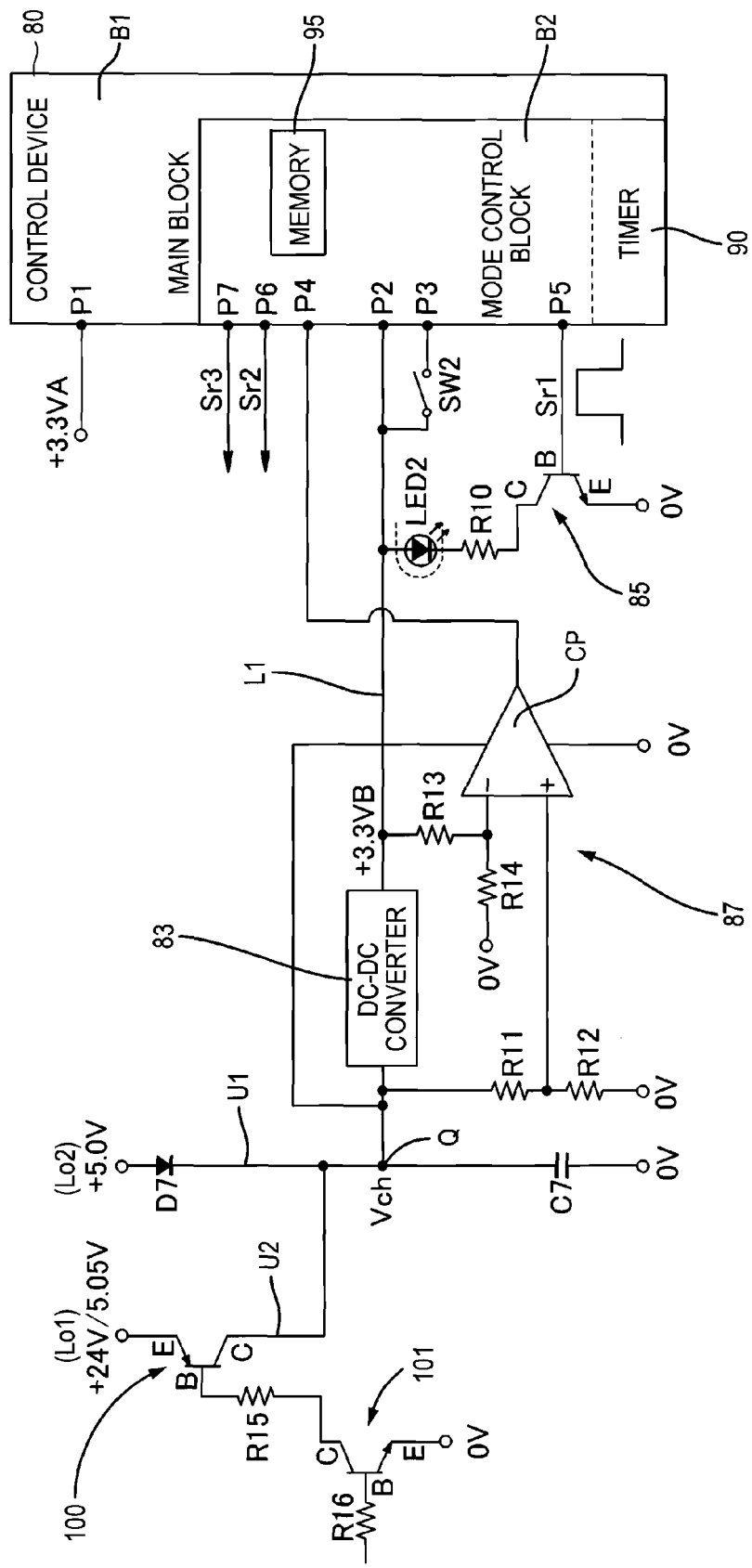
FIG. 8 is a circuit diagram illustrating a control device of a power supply system according to a second embodiment.

As shown in FIG. 8, the second path U2 includes the output line Lo1 of the switching power supply 20 and an output terminal Q of the capacitor C7 which are directly connected to each other and is capable of directly supplying a charging current from the switching power supply 20 to the capacitor C7 without passing through the DC-DC converter 35. A transistor (an example of a "switching unit") 100 is provided on the second path U2. The transistor 100 is a PNP transistor and includes an emitter E connected to the output line Lo1 of the switching power supply 20 and a collector C connected to the output terminal Q of the capacitor C7.

In addition, a collector C of a transistor (an example of a "switching unit") 101 is connected to a base B of the transistor 100 through a resistor R15. The transistor 101 is an NPN transistor and has an emitter E connected to the ground. A base B of the transistor 101 is connected to the output port P7 of the mode control block B2 through a resistor R16.

Figure 9:
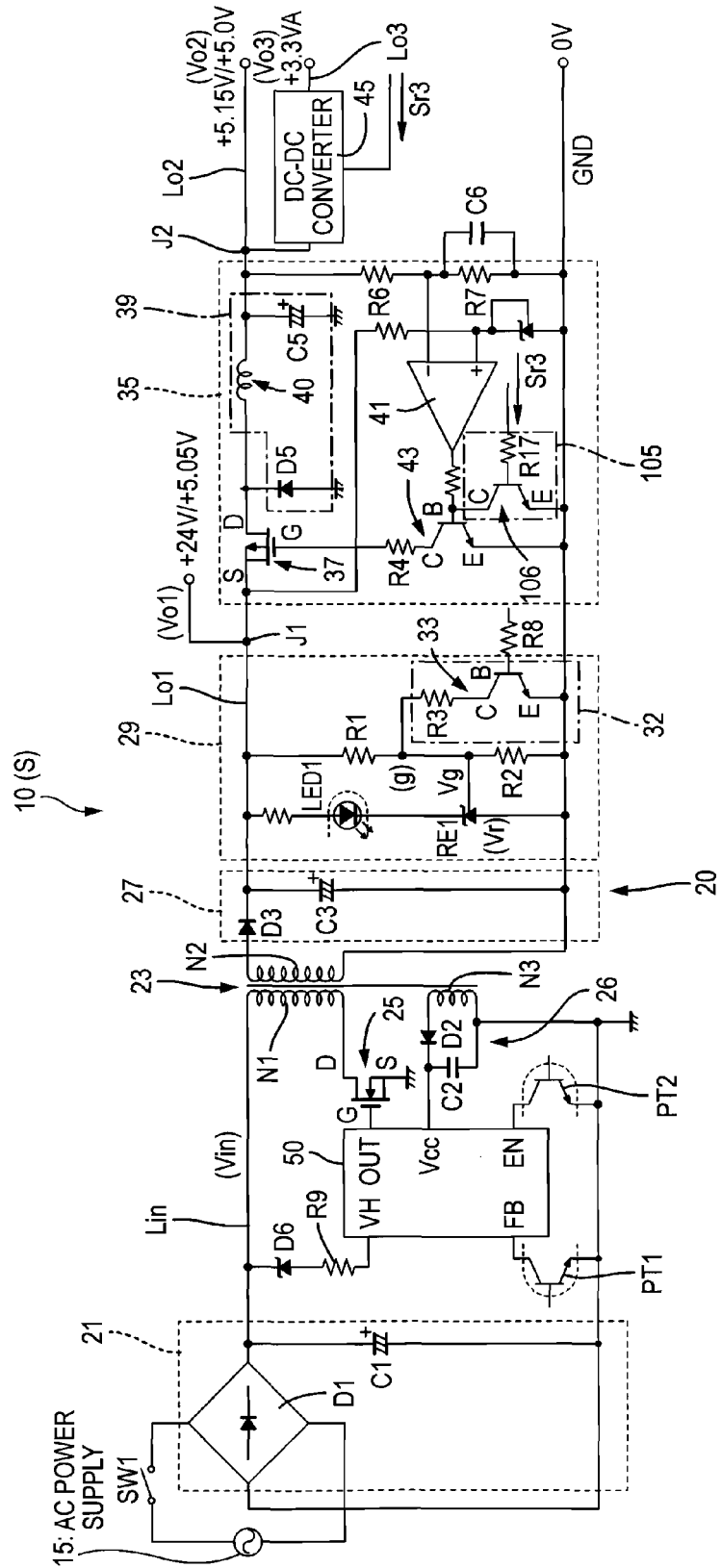
FIG. 9 is a circuit diagram illustrating a power supply device of the power supply system.
Figure 10:
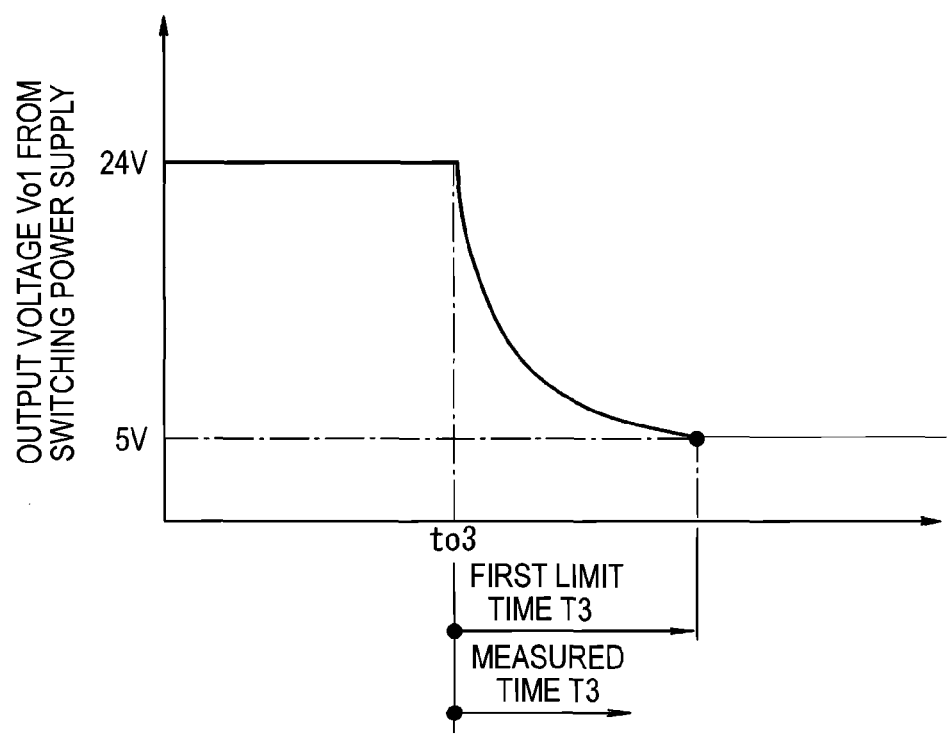
FIG. 10 is a diagram illustrating the waveform of an output voltage from the switching power supply (a voltage drop from 24 V to 5 V)

In the second embodiment, as shown in FIG. 9, a stop circuit 105 is provided in the DC-DC converter 35. The stop circuit 105 includes a transistor 106 and a resistor R17. The transistor 106 is an NPN transistor and includes a collector C connected to the base B of the transistor 43 and an emitter E connected to the ground. In addition, the transistor 106 includes a base B connected to the output port P7 of the mode control block B2 through the resistor R17. The DC-DC converter 45 is provided with the same stop circuit (not shown) as the stop circuit 105 provided in the DC-DC converter 35.

In the second embodiment, when charging is needed in the off mode (specifically, when the time T1 measured by the timer unit 90 reaches the first limit time Tp1 or when a low-level detection signal is output from the comparator CP of the charging voltage detecting circuit 87), the mode control block B2 outputs the control pulse signal Sr1 from the output port P5 and outputs the first control signal Sr2 at a low level from the output port P6, thereby turning off the transistor 33. Then, the voltage division ratio K is set to "K2". In this way, the target voltage of the output voltage Vo1 is "5.05V" and the output voltage Vo1 from the switching power supply 20 is "5.05V".

The mode control block B2 outputs a second control signal Sr3 at a high level from the output port P7. Then, the transistor 101 is turned on, a base potential is reduced, and the transistor 100 is turned on. Then, the second path U2 is closed and the switching power supply 20 supplies a charging current to the capacitor C7 through the second path U2 to charge the capacitor C7.

The second control signal Sr3 output from the output port P7 is input to the stop circuit 105 of the DC-DC converter 35 and a stop circuit (not shown) of the DC-DC converter 45. Then, the transistor 106 of the stop circuit 105 is turned on. As a result, the base potential of the transistor 43 is reduced to a zero volt and the transistor 43 is turned off. Therefore, while the capacitor C7 is being charged, the DC-DC converter 35 is stopped and the output voltage Vo1 is a zero volt. Similarly, the DC-DC converter 45 is stopped and the output voltage V03 is a zero volt. The mode control block B2 corresponds to an example of a "switching control unit" according to the invention. The second control signal Sr3 output from the mode control block B2 corresponds to a "switching signal" and a "stop signal" according to the invention.

As described above, in the second embodiment, when charging is needed in the off mode, a charging current is directly supplied from the switching power supply 20 to the capacitor C7, without passing through the DC-DC converter 35. Therefore, it is possible to prevent the unnecessary power consumption of the DC-DC converter 35 and reduce power consumption. In the second embodiment, when the capacitor C7 is charged in the off mode, both the DC-DC converters 35 and 45 are stopped. Therefore, it is possible to prevent unnecessary power consumption.

When the mode is changed from the normal output mode to the off mode and the capacitor C7 needs to be charged (when the capacitor C7 is not fully charged at that time), first, the mode control block B2 outputs the first control signal Sr2 at a low level from the output port P6. Then, the transistor 33 is turned off. Then, the voltage division ratio K is changed from "K1" to "K2". As a result, the target voltage of the output voltage Vo1 is "5.05 V".

Then, the control IC 50 controls the PWM value (on duty) of the FET 25 such that the output voltage Vo1 from the switching power supply 20 becomes a target value of "5.05 V". Therefore, the output voltage Vo1 of the switching power supply 20 is reduced from 24 V in the normal output mode.

The mode control block B2 directs the timer unit 90 to start the measurement of time from the output time to 3 of the first control signal Sr2. A third limit time Tp3 required for the output voltage from the switching power supply 20 to be reduced from 24 V to 5 V is stored in the internal memory 95 of the mode control block B2 in advance (see FIG. 10).

When the time T3 measured by the timer unit 90 reaches the third limit time Tp3, the mode control block B2 outputs the second control signal Sr3 at a high level from the output port P7. Then, the transistor 101 is turned on, the base potential is reduced, and the transistor 100 is turned on. Then, the second path U2 is closed and a charging current is supplied from the switching power supply 20 to the capacitor C7 through the second path U2 to charge the capacitor C7.

The second control signal Sr3 output from the output port P7 is input to the stop circuit 105 of the DC-DC converter 35 and the stop circuit (not shown) of the DC-DC converter 45. Therefore, while the capacitor C7 is being charged through the second path U2, the circuits 35 and 45 are in a stop state.

As such, when the mode is changed from the normal output mode to the off mode, an operation of switching the charging path of the capacitor C7 is performed after the output voltage Vo1 of the switching power supply 20 is reduced to "5 V". Therefore, it is possible to protect the capacitor C7. The reason why the above-mentioned operation is performed is as follows. The withstanding voltage of the capacitor C7 is about several tens of volts. When a voltage more than the withstanding voltage is applied, deterioration is accelerated and the life span of a product is reduced.

<Third Embodiment>

Figure 11:
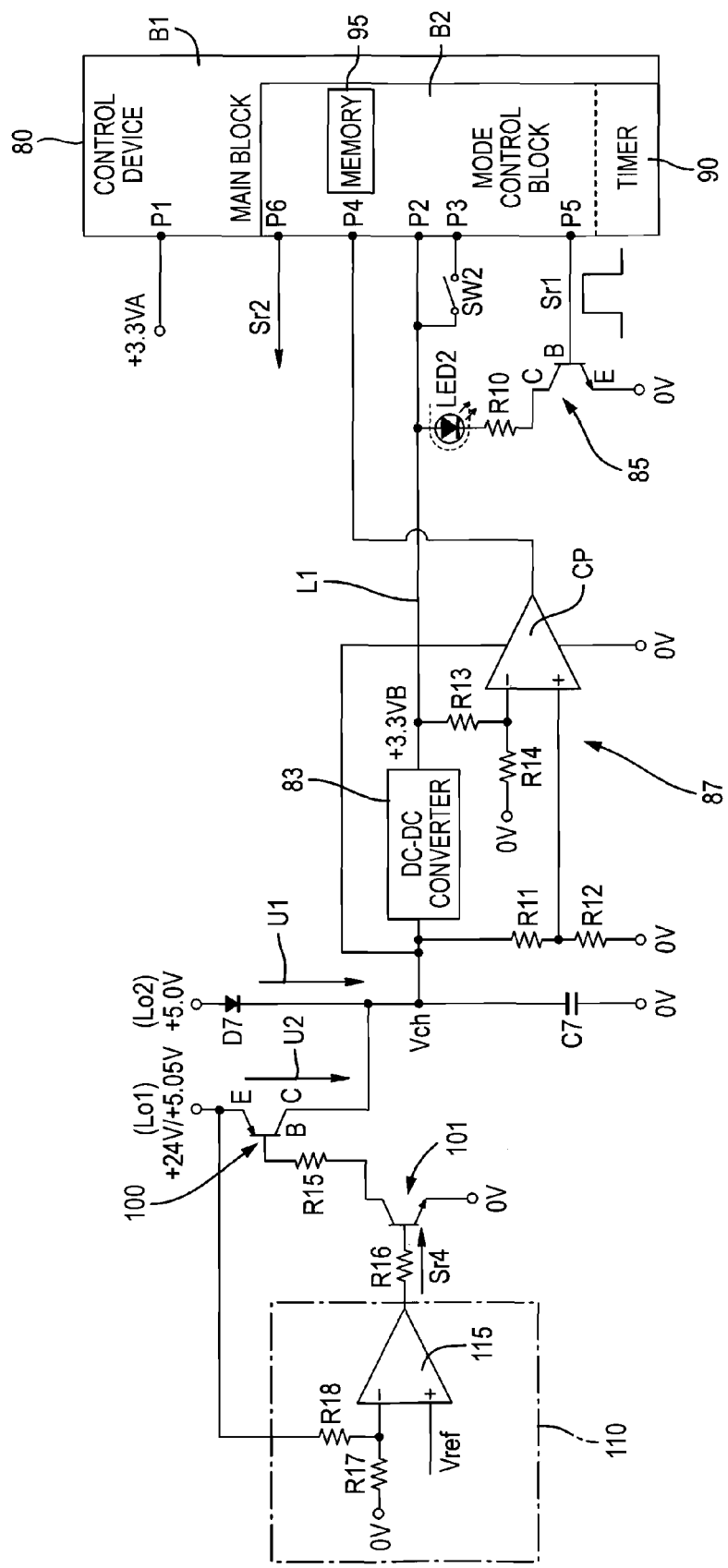
FIG. 11 is a circuit diagram illustrating a control device of a power supply system according to a third embodiment.

A third embodiment of the invention will be described with reference to FIG. 11. The third embodiment is different from the second embodiment in that it further includes an automatic switching circuit 110. The automatic switching circuit 110 includes a comparator 115 and a pair of detection resistors R17 and R18. The comparator 115 includes two input terminals and a reference voltage Vref is applied to a positive input terminal.

A negative input terminal of the comparator 115 is connected to an intermediate connection point between the detection resistors R17 and R18. The detection resistors R17 and R18 are provided between the output line Lo1 of the switching power supply 20 and the ground, divide the output voltage Vo1 from the switching power supply 20 at the resistance ratio, and detect the divided voltages. The output terminal of the comparator 115 is connected to the base B of the transistor 101 through the resistor R16.

When the output voltage Vo1 from the switching power supply 20 is more than "5 V", the comparator 115 outputs a third control signal Sr4 at a low level to the base B of the transistor 101. When the output voltage Vo1 is less than "5 V", the comparator 115 outputs the third control signal Sr4 at a high level to the base B of the transistor 101.

Therefore, when the output voltage Vo1 more than "5 V" is reduced and is less than "5 V", the transistor 101 is automatically changed from an off state to an on state. As a result, the transistor 100 is turned on and the second path U2 is closed. Therefore, a charging current can be supplied from the second path U2 to the capacitor C7.

Therefore, in the third embodiment, it is possible to perform the operation of switching the charging path of the capacitor C7 immediately after the output voltage Vo1 is reduced to "5 V". Therefore, it is possible to rapidly charge the capacitor C7. The detection resistor R17 and the detection resistor R18 are an example of an "output voltage detecting unit" according to the invention and the comparator 115 is an example of a "switching control unit" according to the invention. In addition, the transistor 100 and the transistor 101 are an example of a "switching unit" according to the invention and the "third control signal Sr4" is an example of a "switching signal" according to the invention.

<Other Embodiments>

The invention is not limited to the above description and the embodiments described with reference to the drawings. For example, the following embodiments are also included in the technical scope of the invention.

(1) In the first to third embodiments, the power supply system S is used in the printer. However, the power supply system S may be applied to any electric apparatus and the purpose of use of the power supply system S is not limited to the printer. For example, the power supply system S may be widely applied to home appliances, such as televisions or video players. In addition, in the first to third embodiments, the electrophotographic printer is given as an example, but the invention may be applied to an ink-jet printer.

(2) In the first to third embodiments, the FET (field effect transistor) is given as an example of the semiconductor switching element that switches the transformer 23, but a bipolar transistor may be used.

(3) In the first to third embodiments, the control device 80 includes two functional blocks, that is, the main block B1 and the mode control block B2. However, the control device 80 may include at least the mode control block B2. For example, the main block B1 may be provided separately from the control device 80.

(4) In the first embodiment, when the mode is changed from the normal output mode to the off mode, it is determined whether charging is needed on the basis of whether the capacitor C7 is fully charged. However, the criterion for determining whether charging is needed is not limited to the full charge. For example, a threshold level that is lower than the full charge level by a predetermined value may be set and, when the charge level is more than the threshold level, it may be determined that charging is not needed even though the charging level does not reach the full charge level.

(5) In the first to third embodiments, power is supplied from the capacitor C7 to the mode control block B2 of the control device 80 in the off mode and only the mode control block B2 is operated in the off mode. The mode is changed from the off mode to the normal output mode after the set time Tw3 has elapsed. However, the invention is not limited thereto. For example, in the off mode, the capacitor C4 may supply power to the mode control block B2 and the communication unit 3a and the mode may be changed from the off mode to the normal output mode, using a print instruction from the information terminal apparatus as a trigger. In addition, an operation unit (not shown) for user operation may be provided in the printer 1, power may also be supplied to the operation unit, and the mode may be changed from the off mode to the normal output mode, using the operation of the operation unit by the user as a trigger. However, in the off mode, when power is supplied to the communication unit 3a or the operation unit in addition to the mode control block B2, it is necessary to increase the capacity of the capacitor C7, which is an electric storage unit, or provide a small battery, instead of the capacitor C7.

(6) In the second embodiment, the circuit including two transistors 100 and 101 is provided as a switching unit on the second path U2. Any switching unit may be used as long as it is capable of switching the charging path of the capacitor C7 from the first path to the second path. For example, switches may be provided on both the first path U1 and the second path U2 so as to be alternately turned on and off. In addition, a circuit structure forming the switch is not limited to that according to the second embodiment.

(6) In the second embodiment, the second control signal Sr3 output from the mode control block B2 is input to both the base B of the transistor 101 and the stop circuit 150. That is, the second control signal Sr3 may serve as a switching signal for switching the charging path of the capacitor C7 and a stop signal for stopping the DC-DC converter 35. The stop signal for stopping the DC-DC converter 35 may be output when the charging path is switched to the second path U2 and it may be different from the second control signal Sr3.

(7) In the first to third embodiments, the output voltage Vo1 from the switching power supply 20 is "5.05 V (third output voltage)" in the low output mode and the output voltage Vo1 from the DC-DC converter 35 is "5.15 V (second output voltage)" in the normal output mode. The output voltage Vo1 from the switching power supply 20 in the low output mode may be "5.15 V" which is the same as the output voltage Vo1 from the DC-DC converter 35 in the normal output mode.

What is claimed is:

1. A power supply system comprising:
   a switching power supply that includes a transformer in which a voltage is induced on a secondary side by oscillation of a primary side and a rectifying/smoothing circuit which rectifies and smoothes the induced voltage, the switching power supply configured to output a first output voltage in a normal output mode;
   a step-down circuit that is provided on an output side of the switching power supply and reduces the first output voltage to a second output voltage;
   a control device that controls the switching of the switching power supply between the normal output mode, a low output mode in which an output voltage is a third output voltage less than the first output voltage, and an off mode that stops the oscillation of the primary side of the transformer; and
   an electric storage unit that is charged by the output of the step-down circuit in the normal output mode and supplies power to the control device in the off mode,
   wherein, when charging is needed in the mode other than the normal output mode and the low output mode, the control device controls the switching power supply to output the third output voltage, thereby charging the electric storage unit.

2. The power supply system according to claim 1,
   wherein, when charging is needed in the off mode, the control device controls the switching power supply to output the third output voltage, thereby charging the electric storage unit.

3. The power supply system according to claim 1,
   wherein, when the mode is changed from the normal output mode to the off mode and charging is needed, the control device controls the switching power supply to output the third output voltage, thereby charging the electric storage unit.

4. The power supply system according to claim 2, further comprising:
a switching unit that switches a charging path of the electric storage unit, the charging path including a first path that supplies a charging current from the step-down circuit to the electric storage unit and a second path that directly supplies the charging current from the switching power supply to the electric storage unit without passing through the step-down circuit; and
a switching control unit that outputs a switching signal to the switching unit to set the charging path to the second path when charging is needed in the off mode and/or when the mode is changed from the normal output mode to the off mode and charging is needed.

5. The power supply system according to claim 4, wherein, when the mode is changed from the normal output mode to the off mode and the electric storage unit is charged, the switching control unit outputs the switching signal to the switching unit to switch the charging path from the first path to the second path, at the time when an output voltage from the switching power supply is reduced from the first output voltage to the third output voltage.

6. The power supply system according to claim 5, further comprising:
an output voltage detecting unit that detects the output voltage from the switching power supply,
wherein the switching control unit outputs the switching signal to the switching unit to switch the charging path from the first path to the second path on condition that the output voltage of the switching power supply detected by the output voltage detecting unit is reduced to the third output voltage.

7. The power supply system according to claim 4, further comprising:
a stop circuit that turns off the step-down circuit,
wherein, when the charging path is switched from the first path to the second path, the switching control unit outputs a stop signal to the stop circuit to turn off the step-down circuit.

8. The power supply system according to claim 1, further comprising:
a charging voltage detecting unit that detects a voltage of the electric storage unit.

9. The power supply system according to claim 1, wherein the third output voltage is equal to or less than the second output voltage.

10. An image forming apparatus comprising:
the power supply system according to claim 1;
a high-voltage component that is supplied with power of the first output voltage from the switching power supply of the power supply system and performs a printing process;
a first low-voltage component that is supplied with power of the second output voltage from the step-down circuit of the power supply system and controls the high-voltage component; and
a second low-voltage component that is supplied with power of the second output voltage from the step-down circuit of the power supply system and performs a communication process of receiving print data,
wherein, when the second low-voltage component receives the print data, the first low-voltage component controls the high-voltage component to perform the printing process of printing the print data,
in the normal output mode, the switching power supply supplies the first output voltage to the high-voltage component and the step-down circuit supplies the second output voltage to the first low-voltage component and the second low-voltage component,
in the low output mode, the switching power supply stops the supply of power to the high-voltage component and the step-down circuit supplies the second output voltage to the first low-voltage component and the second low-voltage component, and
in the off mode, the supply of power to both the high-voltage component and the first and second low-voltage components is stopped.

\* \* \* \* \*